United States Patent Office 3,082,272
Patented Mar. 19, 1963

3,082,272
PROCESS FOR METHYLATING OLEFINS
Robert B. Long, Wanamassa, N.J., assignor to Esso Research and Engineering Company, a corporation of Delaware
No Drawing. Filed Oct. 10, 1958, Ser. No. 766,402
11 Claims. (Cl. 260—682)

This invention relates to a process for the methylation of olefins to produce valuable hydrocarbon compounds. More specifically, this invention relates to the methylation of certain olefinic isomers to produce valuable intermediate olefinic hydrocarbons which in turn may be converted to saturated hydrocarbons having high octane ratings.

Numerous processes are known whereby an alkyl group may be attached to various hydrocarbons such as the aromatics, paraffinics and olefinic compounds. In general, prior art processes for the alkylation of an olefinic compound require the use of a relatively expensive alkylation reactant. In particular, it has been suggested to employ an alkyl halide such as methyl chloride in the presence of calcium oxide or the like to add on a methyl group to an olefinic compound. The calcium oxide reacts with the halide radical to form calcium chloride. While this technique is satisfactory for the preparation of alkylates, the reactants are costly and the process is not considered commercially attractive.

It has now been discovered that an olefin may be reacted directly with methyl alcohol in the presence of certain catalysts under elevated temperatures to produce a methylated olefin having the same or different isomeric structure with regard to the double bond. By resort to this invention, there may be employed single or mixed olefins obtained from various sources such as a catalytic cracking process. The olefinic feed is converted to a hydrocarbon having at least one more carbon atom and is usually more highly branched than the feed molecule.

In general, it has been found that an olefin having from 3–20 carbon atoms may be reacted with methanol at temperatures of 550° to 900° F. in the presence of a solid dehydration catalyst such as alumina, silica gel, kieselguhr, molecular sieves, thoria, zirconia, ceria, ZnO, and mixtures of these oxides to effect the addition of a methyl radical to the compound.

While any olefin except ethylene may be employed in this methylation reaction, from a commercial standpoint the greatest incentive lies in the use of olefins having less than about 10 carbon atoms since $C_{10}$ and higher olefins of various isomeric structures may be prepared by even less costly routes such as propylene polymerization, with phosphoric acid catalysts or the like. However, if it is desired to alter the structure of a higher molecular weight olefin, e.g. $C_{10}$–$C_{20}$, these compounds may also be methylated. Preferably, to obtain desired highly branched hydrocarbons, there will be employed an olefin having at least one internal double bond. By the terms "olefin" or "olefinic compound" it is meant to include diolefins as well as monoolefins. Thus, butadiene, isoprene, cyclopentadiene, methyl cyclopentadiene or similar diolefinic hydrocarbons may be employed with the alkylation reactant of this invention to effect mono- or dialkylation. With diolefins, polymerization accompanies the methylation reaction. Since the alkylation product of this invention is an olefin, the use of over stoichiometric amounts of methanol reactant will result in di-, tri- and in fact polyalkylation. As an example, a $C_5$ olefin having an internal double bond may be alkylated in accordance with this invention with methanol as the alkylation reactant over alumina as the dehydration catalyst at elevated temperatures to produce a $C_6$ olefin, and this $C_6$ olefin in turn will react with excess amounts of methanol to add an additional methyl group to the olefin product. Thus, starting with, for example, 1 mole of 2-methylbutene-2 and 2 moles of methyl alcohol, there may be obtained 2,3-dimethylbutene-2 which in turn will react with methyl alcohol to form 2,3,3-trimethylbutene-1, an olefin having 7 carbon atoms as compared to 5 in the original olefin reactant. While employing high molar ratios of methanol to olefin, e.g. over 1:1, will result in polymethylation, the yield suffers somewhat. Best yields have been observed with methanol to olefin ratios below 1:1. In a preferred embodiment the free methanol should be maintained in an amount between 0.1 to 0.5 mole per mole of olefin. Also in accord with this invention, there may be employed carbon monoxide to inhibit isomerization of the double bond, if desired. The amount of methylation or alkylation is easily controlled by the reaction time and relative amounts of methanol and olefin employed. Preferred temperatures for the alkylation reaction are from 600° to 800° F.

To further illustrate the process of this invention, reference may be had to the following examples:

EXAMPLE 1

Trimethyl ethylene, i.e. 2-methylbutene-2, was reacted with equimolar amounts of methanol in vapor phase at 650° F. at atmospheric pressures in the presence of activated alumina for a period of 15 seconds. The resultant liquid hydrocarbon product was a mixture of branched hexenes and heptenes, unreacted feed, and water. The hexenes amounted to 24% of the hydrocarbon product while the heptenes accounted for 2%. The water layer was 10 volume percent on feed. Water of course may be separated by distillation or phase separation. The predominant isomers in the hexene fraction were dimethylbutenes amounting to over 50% of the hexenes. Of these, tetramethyl ethylene or 2,3-dimethylbutene-2 was the major product with 2,3-dimethyl butene-1 the next greatest in quantity.

In the above example, atmospheric pressure was employed and both feeds were passed into the reaction zone as gases. However, pressures up to about 1,000 p.s.i.g. may be used, if desired.

EXAMPLE 2

As a second example, tetramethyl ethylene obtained from the above reaction is reacted with equimolar amounts of methanol under the conditions of Example 1 in the presence of alumina to obtain further methylation whereby 2,3,3-trimethylbutene-1 is produced along with water of reaction. 2,3,3-trimethylbutene-1 is also known as triptene and may be hydrogenated by any conventional technique suitable for the hydrogenation of olefins to produce triptane, a valuable highly branched saturated hydrocarbon.

Although the examples above demonstrate the reaction with regards to relatively pure reactants, there may also be employed crude olefins obtained by various processes. Among the more available sources is, for example, an olefin fraction obtained by catalytically cracking heavy hydrocarbons. One typical pentene fraction obtained by a cracking process will have the following composition.

Table I

| Isomer: | Percent |
|---|---|
| 2-methylbutene-2 | 43 |
| 3-methylbutene-1 | 2 |
| 2-methylbutene-1 | 14 |
| n-Pentenes | 41 |

If desired, this fraction may be isomerized in the presence of known isomerization catalysts to produce a fraction rich in the desired isomer. For example, 2-methylbutene- 2 is particularly preferred as an initial reactant for the preparation of tetramethyl ethylene. By contacting this $C_5$ fraction with 5 A. molecular sieves to remove n-pentenes and then isomerizing the isopentene product with alumina, silica-alumina or other isomerization catalysts at relatively low temperatures, e.g. 100° to 200° F., a $C_5$ fraction containing about 85% 2-methylbutene-2 may be obtained. The isomerization may be carried out if desired in the same reaction zone employed for the methylation reaction. In fact, some isomerization takes place concomitantly with the methylation reaction.

EXAMPLE 3

75 volume percent of a $C_5$ fraction having the approximate composition shown in Table I was contacted with 25 volume percent methanol (stoichiometric amounts) and the mixture was passed over pilled alcoholate alumina at 650° F. and atmospheric pressure with a throughput rate of about 0.25 liquid v./v./hr. By analysis 21% of the feed was converted to $C_6+$ olefins. Approximately 35% of the converted feed was tetramethyl ethylene. It is to be understood that the yields and selectivity can be optimized by employing higher pressures, better dehydration catalysts, and inhibiting double bond isomerization by the addition of carbon monoxide.

The isomeric composition, under equilibrium conditions at 650° F., of the 2,3-dimethylbutenes in the above example comprises approximately 55% 2,3-dimethylbutene-2 and 45% 2,3-dimethylbutene-1. The first of these isomers is especially suitable for conversion to triptane in accordance with the following equations:

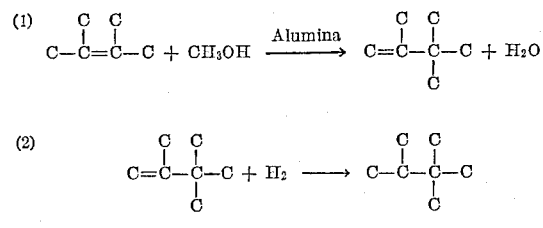

If only triptane is desired, the 2,3-dimethylbutene-1 could be separated from this mixture prior to methylation or the mixture of $C_6$ isomers may be methylated and hydrogenated and triptane product separated from the product obtained from the 2,3-dimethylbutene-1 isomer which would comprise 2,3-dimethylpentane.

By the term "methylation" it is meant to include mono- and polymethylation to synthesize from an olefin having $n$ carbon atoms, an olefin having at least $n+1$ carbon atoms and preferably olefins having from $n+1$ to $n+3$ carbon atoms. The methylation reaction can be stopped at any point, as noted above, to maximize the production of a desired molecular weight olefin. The amount of methylation can be controlled by the methanol-to-olefin ratio, the contact time, the total pressure, and the choice of dehydration catalyst.

Several precautions should be exercised during the methylation reaction. It is desirable in most cases to prevent polymer formation and the catalyst employed should be one which does not exhibit a high degree of polymerization activity. In general a liquid space velocity of 0.1 to 10 v./v./hr. would be preferred in a continuous process; and the process is preferably run in the vapor phase. However, it is to be understood that the process may be carried out liquid phase in a batch operation or a semicontinuous one. Hydrogenation of the methylated olefin product to produce valuable highly branched paraffins does not form a critical part of this invention since any conventional hydrogenation technique may be employed. Similarly, the isomers in most cases will be amenable to separation by fractionation. For example, triptane distills readily from 2,3-dimethylpentane. Also, if desired, the reactants may be treated to increase their purity to rid them, for example, of peroxides and other oxygenated compounds since active oxygenated compounds tend to cause side reactions. The degree of isomerization occurring during the methylation reaction can be controlled to a great extent by selecting the proper dehydration catalyst. Alumina is known to have a relatively high activity for isomerization of olefins and would tend to decrease the yield of highly branched methylated olefins by shifting an internal double bond to an alpha position. If desired, to produce the more highly branched compounds, silica gel, calcium sulfate, thoria, zinc oxide, thoria-alumina, thoria-zinc oxide and zinc oxide-alumina may be employed. Employing lower molecular weight olefins and especially those having an external double bond such as propylene, butene-1 and the like, more severe operating conditions are preferred. Typically, in methylating propylene, it is preferred to operate in a range of from 700° to 900° F.

Further examples showing the various effects of temperature, ratio of methanol to olefin and type of catalyst follow:

EXAMPLE 4

Stoichiometric amounts of methanol in vapor phase were reacted with 2-methyl-2-butene at 650° F. over an alumina catalyst and a molecular sieve (5 A.) catalyst. The yield at this temperature employing the alumina catalyst was 32% hexenes, whereas the molecular sieve under the same conditions produced only 7.7% yield based on olefin feed. When lower temperatures were employed with the molecular sieve, even lower yields were obtained. The above experiments indicate that a molecular sieve catalyst requires more severe operating conditions.

EXAMPLE 5

2-methyl-2-butene was methylated with methanol at 650° F. and a space velocity of 0.33 v./v./hr. employing 10 volume percent methanol in feed and 25 volume percent methanol in feed with the following results:

Catalyst, uncalcined alumina
Methanol in feed, vol. percent (mole/mole): 10 (.3:1), 25 (1:1)
Temperature, ° F., 650
Space velocity, v./v./hr., 0.33
Yield, vol. percent on $C_5=$ feed, total hexenes: 13.3, 7.3
Methylated product, percent of theoretical: 40, 7

The above example indicates the increased yields obtainable by employing less than stoichiometric amounts of methanol.

The following table further shows the effect of temperature and methanol to olefin ratio:

*Table II*

METHYLATION OF 2-METHYL-2-BUTENE

| Catalyst | Effect of temp., calcined | | Effect of CH₂OH/ olefin, uncalcined | |
|---|---|---|---|---|
| | Alcoholate | Alumina | Alcoholate | Alumina |
| CH₂OH in feed, vol. percent (mol ratio) | 25 (1:1) | 25 (1:1) | 25 (1:1) | 10 (0.3:1) |
| Temperature, ° F. | 650 | 700 | 650 | 650 |
| Liquid space velocity, v./hr./v | 0.25 | 0.25 | 0.33 | 0.33 |
| Yield, vol. percent based on olefin: | | | | |
| Total hexenes | 32 | 19 | 7.3 | 13.3 |
| 2,3-dimethyl-2-: | | | | |
| Butene | 6 | 4.4 | 3.1 | 4.0 |
| Total heptenes | 3 | 3.1 | 0 | 0 |
| Total methylated prod., percent of theoretical | 38 | 25 | 7 | 40 |

The following table shows the effect of CO and hydrogen on the reaction:

*Table III*

CO AND $H_2$ INHIBIT REACTION BUT IMPROVE SELECTIVITY

|  | Effect of Hydrogen, Uncalcined | | Effect of Carbon monoxide, unclacined | |
| --- | --- | --- | --- | --- |
|  | Alcoholate | Alumina | Alcoholate | Alumina |
| Feed | | 2-methyl-2-butene | | |
| Catalyst | | Calcined alumina | | |
| Temperature, °F | 750 | 750 | 750 | 750 |
| Added gas [1] | None | $H^2$ | CO | None |
| Methanol in feed, vol. percent liquid | 25 | 25 | 25 | 25 |
| Residence time, sec | 20 | 20 | 30 | 30 |
| Yield, vol. percent on $C_5$- feed: | | | | |
| Total hexenes | 2.1 | 6.5 | 5.9 | 23 |
| 2,3-DM-2-$C_4$- | 2.1 | 2.1 | 2.5 | 2.3 |
| Total heptenes | 1.9 | 0.3 | 0.5 | 2.0 |
| Tetramethylethylene, percent of total hexenes | 10 | 32 | 42 | 10 |

[1] 1 mole CO/mole olefin, mole ratio of olefin to methanol equals 1.0
2.6 moles $H_2$/mole olefin, mole ratio of olefin to methanol equals 1.0.

At 6% conversion to total hexenes with $Al_2O_3$ at 750° F. selectivity to tetramethylethylene is only 10–15% of the total hexenes.

In Table III it is noted that the addition of CO and hydrogen inhibit the reaction substantially; however, the selectivity to the desired 2,3-dimethyl-2-butene is increased markedly.

EXAMPLE 6

It was attempted to methylate ethylene with methanol in a 1:1 mole ratio, of alumina at 750° F. and atmospheric pressure. With a residence time of 45 seconds, no methylation occurred.

EXAMPLE 7

Propylene which contains a double bond in alpha position was methylated with methanol in a 1:1 mole ratio over alumina at 750° F. and atmospheric pressure. Only small amounts of $C_4$ olefin product were obtained. Higher temperatures and/or longer residence times are required for alpha olefins.

EXAMPLE 8

Butadiene was methylated with methanol under similar conditions to produce small yields, e.g. 2% of $C_5$ methylated product; however, the reaction was largely obscured by the production of $C_7$–$C_{12}$ polymer.

Liquid dehydration catalysts such as sulfuric acid were found to be inoperable since the olefin was polymerized. Stainless steel packing gave no reaction at 600° F. From the above data it is apparent that the preferred catalysts for the present methylation reaction are alumina; and molecular sieve, a metal alumino silicate.

The following two tables show additional methylation runs wherein the preferred catalysts are employed under various temperatures from 450° to 800° F. and wherein the ratio of methanol to olefin reactant is varied.

*Table IV*

METHYLATION OF 2-METHYL-2-BUTENE

| Run No. 871– | 79 | 80 | 81 | 83 | 84 | 85 | 86 | 87 |
| --- | --- | --- | --- | --- | --- | --- | --- | --- |
| Feed stock | 75 vol. percent 2-methyl-2-butene plus 25 vol. percent methanol | | | | | | | |
| Catalyst | Pilled alcoholate alumina | | | | | | | |
| Temperature, °F | 650 | 700 | 750 | 700 | 750 | 800 | 700 | 700 |
| Pressure, p.s.i.g | Atmospheric | | | | | | | |
| Feed rate, v./v./hr | 0.25 | 0.45 | 0.58 | 1.0 | 1.0 | 1.0 | 1.0 | 0.25 |
| Product yields: | | | | | | | | |
| Gas, weight percent | ([1]) | 4.0 | 5.1 | 4.0 | 5.1 | 7.2 | 3.0 | 2.3 |
| Hydrocarbon layer, vol. percent | 82.6 | 80.3 | 76.6 | 78.3 | 80.9 | 76.7 | 85.4 | 77.1 |
| Water layer, vol. percent | 10.2 | 9.7 | 10.3 | 10.7 | 11.5 | 10.8 | 10.0 | 10.5 |
| Material balance, weight percent | 95 | 97 | 97 | 97 | 102 | 100 | 101 | 93 |
| Hydrocarbon layer, mole percent: | | | | | | | | |
| Total pentenes | 73.1 | 85.7 | 76.1 | 86.1 | 72.0 | 79.6 | 77.1 | 81.2 |
| 2-methyl-2-butene | 37.2 | 49.0 | 41.5 | 51.4 | 42.6 | 41.1 | 64.5 | 50.7 |
| Total hexenes | 23.8 | 12.4 | 21.3 | 10.1 | 19.8 | 17.6 | 18.7 | 15.1 |

[1] Gas not measured.

*Table V*

METHYLATION OF 2-METHYL-2-BUTENE

| Run No. 871– | 90 | 91 | 92 | 94 | 95 | 100 | 102 | 103 | 104 | 105 | 106 |
| --- | --- | --- | --- | --- | --- | --- | --- | --- | --- | --- | --- |
| Feed stock | 75 vol. percent 2-methyl-2-butene plus 25 vol. percent methanol | | | | | 25 methanol-75 2MB-2 | | | 10.0 methanol-90.0 2MB-2 | | |
| Catalyst | 5A molecular sieve | | | | | Pilled alcoholate alumina | | | | | |
| Temperature, °F | 650 | 600 | 550 | 500 | 450 | 450 | 550 | 650 | 650 | 550 | 450 |
| Pressure, p.s.i.g | Atmospheric | | | | | | | | | | |
| Feed rate, v./v./hr | 0.25 | 0.25 | 0.25 | 0.25 | 0.25 | 0.33 | 0.33 | 0.33 | 0.33 | 0.33 | 0.33 |
| Product yields: | | | | | | | | | | | |
| Gas, weight percent | ([1]) | 1.5 | 1.8 | 0.9 | 0.9 | 0.6 | 0.5 | 5.2 | 1.0 | 0.2 | 0.4 |
| Hydrocarbon layer, vol. percent | 74.5 | 76.1 | 80.9 | 88.0 | 86.2 | 94.4 | 107.2 | 92.6 | 104.9 | 104.2 | 101.4 |
| Water layer, vol. percent | 9.3 | 11.2 | 8.8 | 8.6 | 8.3 | 7.0 | 8.0 | 10.2 | 3.7 | 3.4 | 2.9 |
| Material balance, weight percent | 88 | 92 | 93 | 98 | 96 | 101 | 115 | 109 | 106 | 105 | 102 |
| Hydrocarbon layer, mole percent: | | | | | | | | | | | |
| Total pentenes | 93.4 | 95.8 | 99.0 | 99.3 | 99.5 | 100.0 | 100.0 | 95.1 | 90.5 | 95.9 | 100.0 |
| 2-methyl-2-butene | 59.2 | 60.8 | 62.3 | 62.4 | 64.3 | 74.3 | 64.5 | 56.8 | 63.4 | 69.0 | 78.3 |
| Total hexenes | 6.4 | 2.6 | .91 | 0.5 | 0.5 | 0.0 | 0.0 | 4.9 | 9.5 | 4.1 | 0.0 |

[1] Gas not measured.

What is claimed is:
1. A process for synthesizing an olefin having 4 to 10 carbon atoms which comprises reacting a $C_3$–$C_9$ monoolefin feed with methanol at a temperature in the range of 550–900° F. in contact with a solid dehydration catalyst to produce an olefin product having at least 1 more carbon atom than said olefin feed and being more branched than said olefin feed.

2. A process in accordance with claim 1 wherein said olefin product contains one more carbon atom than said olefin feed.

3. A method for preparing an olefin having at least $n+1$ carbon atoms which comprises reacting an olefin having $n$ carbon atoms with methanol at temperatures of 600° to 900° F. and at pressures of atomspheric to 1000 p.s.i.g. in contact with a solid dehydration catalyst, wherein $n$ represents an integer from 3 to 20.

4. A process in accordance with claim 3 wherein said catalyst is alumina.

5. A process in accordance with claim 3 wherein said catalyst is a molecular sieve.

6. A process for converting trimethyl ethylene to tetramethyl ethylene which comprises reacting trimethyl ethylene with methanol at 600°–800° F. in contact with a solid dehydration catalyst to obtain a reaction product mixture containing said tetramethyl ethylene product.

7. A process in accordance with claim 6 wherein said tetramethyl ethylene is further converted to triptene by reacting at least one mole of methyl alcohol per mole of tetramethyl ethylene at elevated temperatures in the presence of a solid dehydration catalyst.

8. A process in accordance with claim 7 wherein said triptene is hydrogenated to form triptane.

9. A method for methylating an olefin which comprises reacting methanol with an olefin having from 4–20 carbon atoms and having an internal double bond in vapor phase at a temperature between 550° to 900° F. in the presence of a solid dehydration catalyst selected from the group consisting of alumina and molecular sieves, maintaining in the reaction mixture less than one mole of free methyl alcohol per mole of olefin reactant.

10. A method in accordance with claim 9 wherein the methanol is maintained in a mole ratio of .1 to .5 per mole of olefin.

11. A method for methylating a $C_4$–$C_{10}$ olefin which comprises reacting therewith from 0.1 to 0.5 moles of methanol per mole of olefin, said olefin having an internal double bond, in vapor phase at a temperature between 600°–800° F. in the presence of a solid dehydration catalyst and further in the presence of sufficient gas selected from the group consisting of hydrogen and carbon monoxide to improve the selectivity of the reaction to highly branched olefinic products.

References Cited in the file of this patent

UNITED STATES PATENTS

| | | |
|---|---|---|
| 2,410,445 | Ipatieff et al. | Nov. 5, 1946 |
| 2,456,584 | Gorin et al. | Dec. 14, 1948 |
| 2,492,984 | Grosse et al. | Jan. 3, 1950 |
| 2,561,483 | Seon et al. | July 24, 1951 |
| 2,668,181 | Banes et al. | Feb. 2, 1954 |
| 2,739,995 | Copenhaver | Mar. 27, 1956 |
| 2,922,822 | Beach | Jan. 26, 1960 |